Patented Jan. 15, 1946

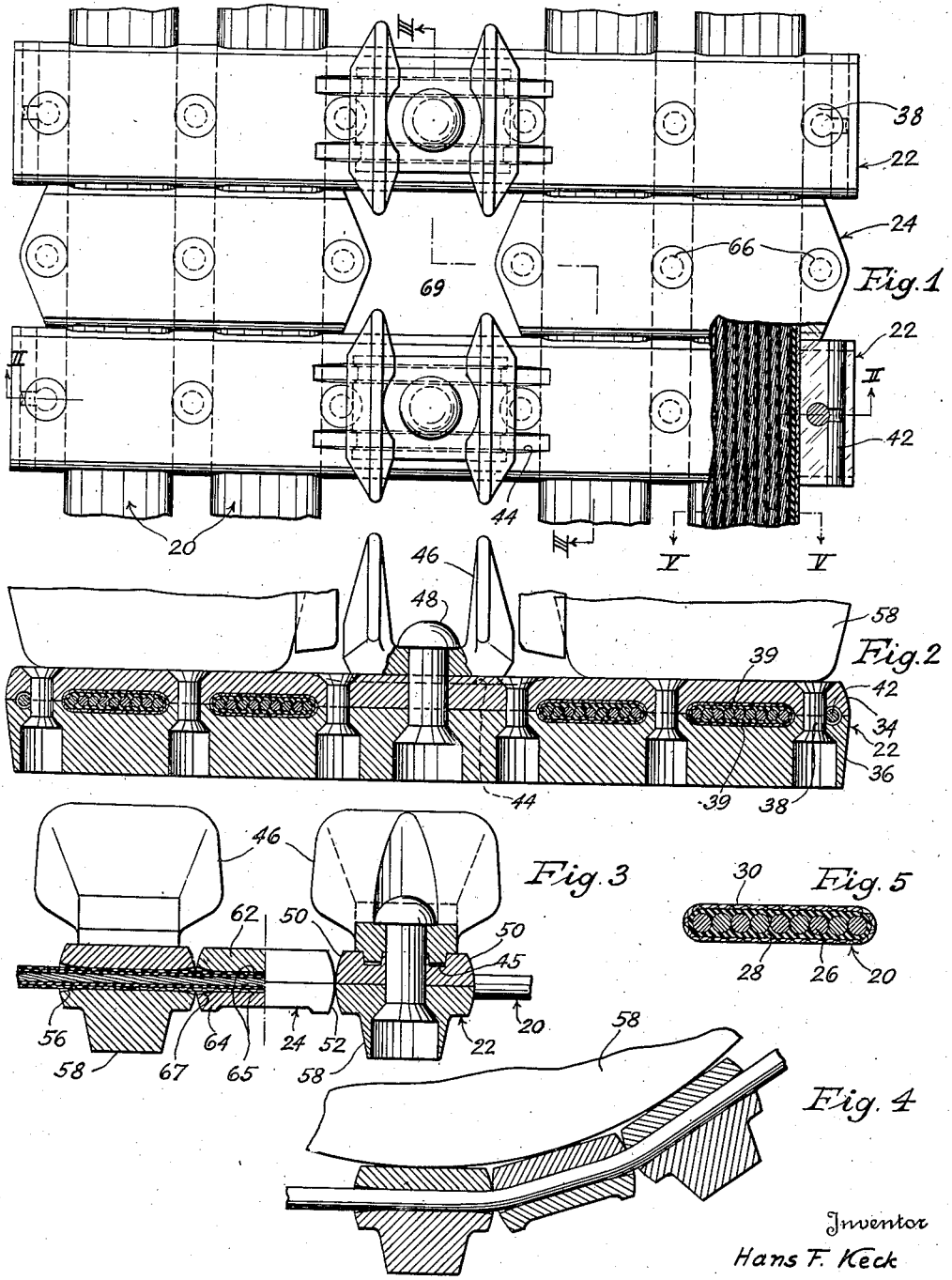

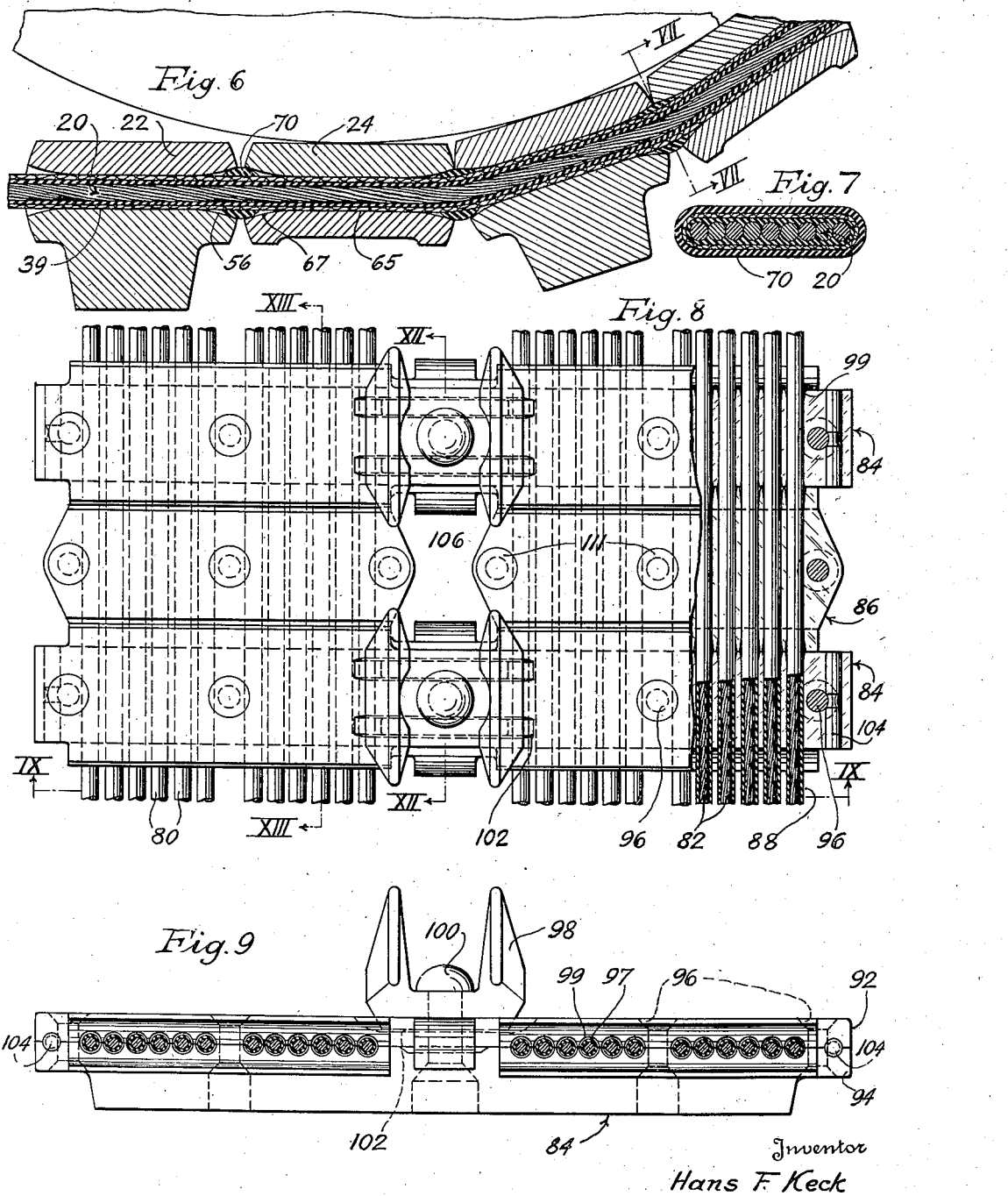

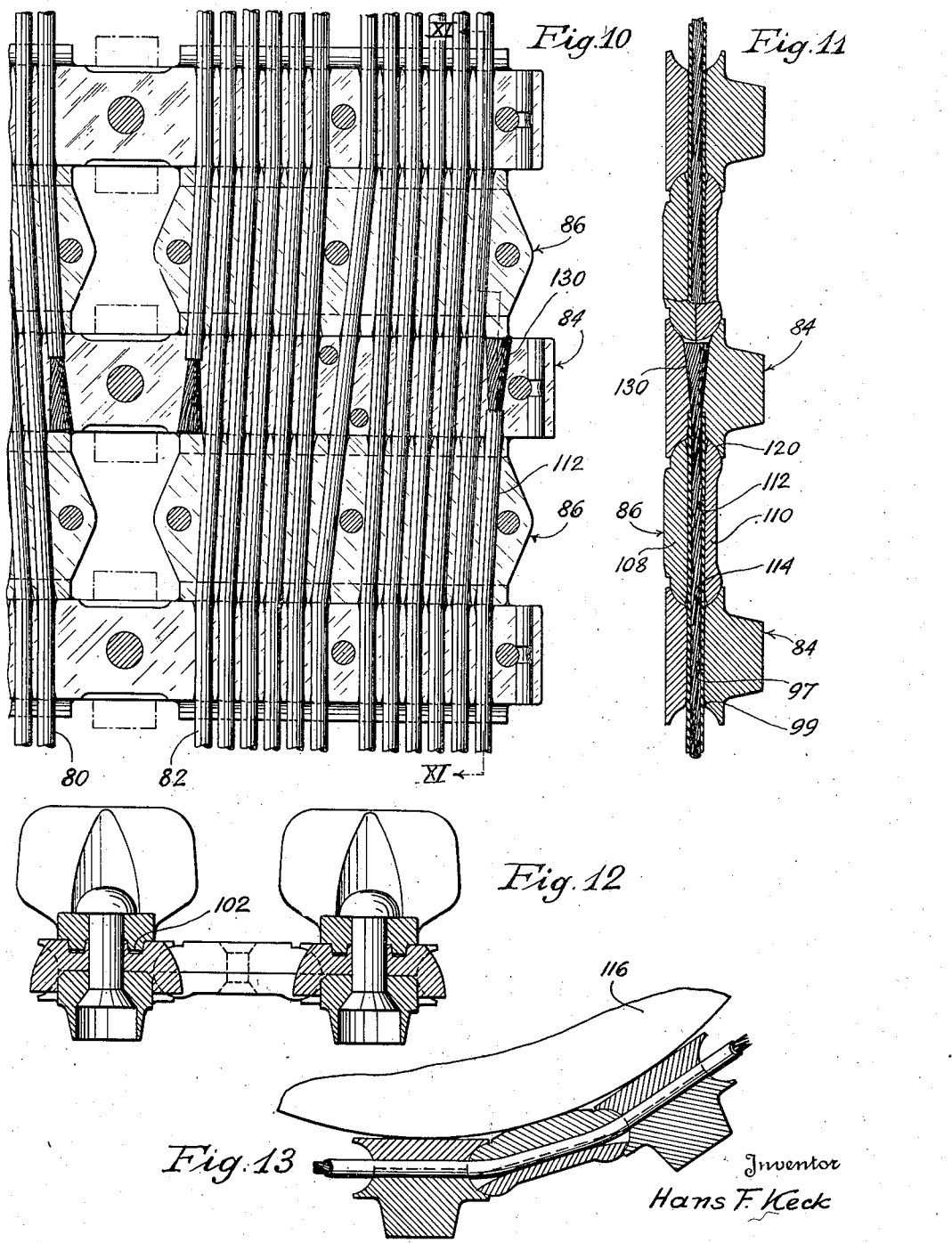

2,392,988

UNITED STATES PATENT OFFICE 2,392,988

TRACTOR AND TANK TRACK

Hans F. Keck, Akron, Ohio, assignor to Wingfoot Corporation, Wilmington, Del., a corporation of Delaware Application July 15, 1942, Serial No. 450,991

15 Claims. (Cl. 305—10)

This invention relates to endless tracks for use with tractors, tanks, and the like, and, more particularly, is concerned with such tracks employing a minimum of rubber.

It is the general object of my invention to provide a new and improved endless track for use with tanks, tractors, and other vehicles, the track being relatively inexpensive to manufacture, long-lived, and substantially free of rubber.

Another object of my invention is the provision of an endless track of the character described, and employing a plurality of relatively narrow endless belts of rubberized fabric reinforced with steel cables to which are secured a plurality of metal shoes having rolling or semi-cylindrical hinge connections or contacts end to end with each other.

Another object of my invention is to provide an endless track including one or more rubber-covered cables wound to helical form for supporting a plurality of metal shoes, each having a rolling or semi-hinge connection with adjacent shoes.

Another object of my invention is the provision of an endless track including a plurality of metal shoes flexibly connected together by metal cables, the track being suitably insulated against sand or dirt working in between the cable or cables and the shoes so that abrasive and cutting action is kept to a minimum.

The foregoing objects of my invention, and other objects thereof which will become apparent as the description proceeds, are achieved by the provision of an endless track or tracks of the type or types illustrated in the accompanying drawings, wherein Fig. 1 is a plan view in fragmentary form of one embodiment of endless track constructed in accordance with my invention; Fig. 2 is a vertical cross-sectional view through the track of Fig. 1 and taken substantially on line II—II thereof; Fig. 3 is a fragmentary longitudinal cross-sectional view taken on substantially line III—III of Fig. 1; Fig. 4 is a view similar to Fig. 3, but illustrating a portion of the endless track in contact with the periphery of a supporting wheel; Fig. 5 is a cross-sectional view, on enlarged scale, taken substantially on line V—V of Fig. 1 and illustrating the construction of one of the endless belts incorporated with the illustrated embodiment of my improved endless track; Fig. 6 is a view similar to Fig. 4, but illustrating a modified form of track structure; Fig. 7 is a cross-sectional view of one of the endless belts incorporated in the structure of Fig. 6 and taken substantially on line VII—VII thereof; Fig. 8 is a plan view of another embodiment of endless track constructed in accordance with the principles of my invention; Fig. 9 is a cross-sectional view taken substantially on line IX—IX of Fig. 8; Fig. 10 is a view similar to Fig. 8, but taken in the region of the cable ends and with the radially inner plates of the metal shoes removed; Fig. 11 is a longitudinal cross-sectional view taken on line XI—XI of Fig. 10; Fig. 12 is a fragmentary longitudinal cross-sectional view taken substantially on line XII—XII of Fig. 8; and Fig. 13 is a view similar to Fig. 11, but illustrating a portion of the track in contact with the periphery of a wheel supporting the track.

Referring particularly to the embodiment of the invention illustrated in Figs. 1 to 5 of the drawings, the numeral 20 indicates generally a plurality of endless belts to which are secured a plurality of metal shoes indicated as a whole by the numerals 22 and 24. Each of the belts 20 comprises a plurality of helical convolutions of metal wire 26, generally in the form of steel cables of high tensile strength and possessing high characteristics of flexibility. The convolutions of reinforcing wire or cable are covered and surrounded by a body of rubber 28, providing a layer of rubber on the top and bottom of the cables. Surrounding the body of rubber is a rubberized fabric cover 30 which may or may not be included, but in any event with the entire endless belt being suitably vulcanized to form a unitary flexible band or belt of high strength. The wire or cables 26 are preferably suitably brass-plated and cemented so that the rubber body 28 during vulcanization, flows into intimate contact therewith and is firmly secured thereto. The ends of the wires or cables 26 provided in each belt may be suitably clipped or otherwise secured to adjacent convolutions of the wire or cable to hold them in position, as will be understood by those skilled in the art.

Preferably, the flexible bands 20 are relatively thin in a vertical direction and are relatively narrow so that they can be readily handled, and a plurality of the belts are employed in conjunction with the complete endless track. I have conveniently illustrated the track as including four belts 20, although it should be particularly understood that a greater or lesser number of belts may be employed. Of course, if only two belts are employed in the endless track, the width of the belts will normally be increased, depending upon the desired width of the completed track.

The main metal shoes 22 mounted upon the endless belts 20 take the form, in the embodiment of my invention illustrated, of an inner plate 34 and an outer plate 36 secured together by a plurality of rivets 38 positioned in complementary openings in the inner and outer plates and having countersunk portions receiving the heads of the rivets. The inner plate 34 and the outer plate 36 of each metal shoe 22 are provided with complementary recesses 39 snugly receiving and clamping the endless belts 20 in the manner clearly illustrated in Fig. 2 of the drawings. Further, in order to additionally lock the inner metal plate 34 to the outer plate 36, and to properly align the respective plates with each other, both ends of the plates are provided with complementary recesses receiving a metal pin 42 which is grooved near its center so that the pin can be held against endwise movement by the end rivets 38.

The center and radially inner surface of the radially inner plate 34 is formed with a pair of parallel grooves 44 of shallow depth into which fit complementary ribs 45 on the bottom of a U-shaped track aligning or guide member 46 and which is secured to the metal shoe 22 by a rivet 48 extending through both the radially inner plate 34 and the radially outer plate 36.

The ends of the metal shoe 22 are curved, as at 50, best seen in Fig. 3 of the drawings, so that the metal shoes 22 mounted on the endless belts 20 may have rolling engagement with the adjacent metal shoes 24 which are also provided with arcuate or curved ends 52. The ends of the belt receiving recesses 39 in the metal shoes 22 may be slightly flared, as indicated by the numeral 56, and as evident from Figs. 3 and 4 of the drawings, whereby the bending or wrapping of the endless track around a supporting or driving wheel 58 is facilitated. The radially outer plate 36 of each metal shoe 22 is usually formed with an upstanding rib or tread portion 58 which provides a heavy driving lug or rib on each metal shoe 22 of the endless track.

Turning now to the construction of the metal shoes 24, which I call link-shoes inasmuch as they serve both as connecting links and as shoes, it will be seen from Fig. 1 that the link-shoes are used in pairs, and each link-shoe 24 has a lateral width in the endless track of somewhat less than one-half the width of the complete track. The ends of each link-shoe 24 are conveniently somewhat rounded or slightly pointed, as seen in Fig. 1. Each link-shoe 24 includes a radially inner plate 62 and a radially outer plate 64, which plates are provided with complementary recesses 65 for receiving and clamping the belts 20, and with the plates being secured together by rivets 66 of a type similar to the rivets 38 joining the parts of the metal shoe 22. The ends of the recesses 65 may be flared, as at 67, to facilitate wrapping or bending the track around a supporting wheel. By using a pair of laterally-short link-shoes 24 between adjacent main shoes 22, a space 69 is provided in the center of the endless track between every pair of link-shoes 24 and adjacent main shoes 22 for engagement with the driving teeth of a driving sprocket or wheel generally employed in conjunction with the endless track.

Figs. 6 and 7 illustrate a modification of the endless track structure shown particularly in Figs. 1 to 5. Specifically, a rubber collar or washer of endless oval form, and indicated by the numeral 70, is secured between the ends of each of the metal shoes 22 and 24 and surrounds the endless belt 20. The flared ends 56 and 67 of the recesses 39 and 65, respectively, in each of the metal shoes is thereby substantially sealed by the rubber member 70 so that sand, dirt or other foreign matter is prevented from working into the recesses 39 and 65 and the life of the endless track is maintained for the greatest length of time.

The embodiment of my invention illustrated in Figs. 8 to 13 is somewhat different that already described and includes a pair of cables, indicated by the numerals 80 and 82, each cable being formed into a helical convolution of opposite hand, and with the cables mounting a plurality of metal shoes, indicated as a whole by the numerals 84 and 86. The cables 80 and 82 generally are made of steel and include a plurality of individual strands or wires of such character that the complete cable is of relatively high tensile strength but of considerable flexibility. Each convolution of the cables 80 and 82 is covered by a substantially cylindrical covering of rubber 88 which is preferably vulcanized to the cable so that the rubber flows down into the valleys between the individual wires and strands of the cable, whereby a relatively strong bond is made between the rubber and the cable. Conveniently, the cable is suitably brass-plated and cemented so as to facilitate the vulcanization of the rubber directly to the metal of the cable.

Each of the main metal shoes 84 preferably includes an inner metal plate 92 and an outer metal plate 94, which plates are secured together by suitable countersunk rivets 96. Complemental recesses 97, generally having flared ends 99, are provided in the plates 92 and 94 to receive and clamp the cables 80 and 82.

A U-shaped aligning or guiding member 98 is secured to the central portion of the radially inner plate 92, as, for example, by rivet 100, and cooperating ribs and grooves 102 may be provided between the engaging surfaces of the guiding member 98 and the metal plate 92. Locking pins 104 may be provided at the outermost portions of the plates 92 and 94 and in the manner described in conjunction with the embodiment of my invention shown in Figs. 1 to 5, and above discussed.

Positioned between adjacent main shoes 84 is a pair of metal link-shoes 86, each one of the pair of link-shoes 86 being of a width less than one-half the total width of the endless track so that openings 106 are provided in the center of the endless track at uniformly spaced intervals. Each link-shoe 86 includes an inner metal plate 108 and an outer metal plate 110, with these plates being held together by countersunk rivets 111 in a manner that will be fully understood from the preceding description. Each of the plates 108 and 110 of the link-shoes 86 is provided with a plurality of complemental semi-circular longitudinally-extending recesses 112 which receive and closely surround and grip a portion of the cables 80 and 82, all in a manner clearly illustrated in the drawings. The ends of the recesses 112 are conveniently slightly flared, as at 114, to facilitate the bending or wrapping of the endless track around the arcuate periphery of a driving or supporting wheel 116, as shown particularly in Fig. 13.

This embodiment of my invention differs from that of Figs. 1 to 5 in a second respect, and that is, adjacent portions of the metal shoes 84 and 86 are provided with cooperating semi-cylindrical hinge joints which have been indicated by the numeral 120. Generally I form the ends of the link-shoes 86 with the cylindrical portions of the joint and form the ends of the main shoes 84 with complementary socket portions; however, this relation of position of the cylinder and socket may, if desired, be reversed. By this construction I am able to prevent a large proportion of sand, dirt, or other foreign matter from working into the endless track between the metal shoes and the cables thereof.

Fig. 10 particularly illustrates the manner of securing the ends of the cables 80 and 82 to the metal shoes mounted thereon. Conveniently, the ends of the cables 80 and 82 are scraped clear of the rubber cover 88 and are appropriately splayed and soldered or brazed so as to take substantially the conical shape indicated by the numeral 130, with the splayed ends of the cables being received in complementary frustro-conical seats machined in the plates of the metal shoes 84. The link-shoes 86 immediately adjacent the shoes 84, which reclamp the ends of the cables, are provided with laterally inclined recesses 112 for receiving the cables, whereby helical cable convolutions are provided in which the turns extend in a truly circumferential and parallel manner over substantially the entire periphery of the endless track and extend at a slight angle to the true circumference over only a short portion of the length of the track.

From the foregoing it is believed that it will be evident that the objects of my invention have been achieved by the provision of an improved endless track for tractors, tanks, and the like, employing a minimum amount of rubber and flexibly mounting a plurality of metal shoes upon rubber-covered cables or rubber-covered cable-reinforced belts. Infiltration of sand, grit, and other foreign matter into the working parts of the endless track is reduced to a minimum. The endless track provided is relatively inexpensive to manufacture and assemble, and is relatively long-lived in service.

While, in accordance with the patent statutes, I have particularly illustrated and described certain embodiments of my invention, it should be expressly understood that I am not to be limited thereto or thereby, but that the scope of my invention is defined in the appended claims.

What I claim is:

1. An endless track for tractors, tanks, and the like, comprising a plurality of endless belts positioned side by side but spaced apart laterally of each other, each belt including a helical convolution of flexible steel cable, a body of rubber surrounding the cable and vulcanized thereto, a covering layer of rubberized fabric surrounding and vulcanized to the body, a plurality of metal shoes secured to the belts, every other metal shoe including an outer plate of considerable thickness and an inner plate, countersunk rivets securing the plates together, a track guide member secured to the center of the inner side of the shoe, the alternate metal shoes including parts laterally spaced from each other so as to provide recurrent central openings in the track for the reception of a series of track driving lugs, each part of the alternate metal shoes comprising an inner plate and an outer plate, and countersunk rivets securing the plates together, the plates of the other and alternate shoes being provided with complementary recesses receiving and tightly surrounding the belts, the ends of the recesses being flared to facilitate the bending of the track around a wheel, the adjacent sides of the other and alternate shoes being curved so as to provide a rolling contact between shoes in the operation of the track.

2. An endless track for tractors, tanks, and the like, comprising a plurality of endless belts positioned side by side but spaced apart laterally of each other, each belt including a reinforcing layer of flexible steel cable, a body of rubber surrounding the cable and vulcanized thereto, a plurality of metal shoes secured to the belts, every other metal shoe being a main shoe including an inner plate and a thick outer plate, means securing the plates together, a track guide member secured to the center of the inner side of the shoe, the alternate metal shoes being link-shoes and including parts laterally spaced from each other so as to provide recurrent central openings in the track for the reception of a series of track driving lugs, each part of the link-shoes comprising an inner plate and an outer plate, and means securing the plates together, the plates of the main and link-shoes being provided with complementary recesses receiving and tightly surrounding the belts, the adjacent sides of the shoes being curved so as to provide a rolling contact between shoes in the operation of the track.

3. An endless track for tractors, tanks, and the like, comprising a plurality of endless belts positioned side by side but spaced apart laterally of each other, each belt including a reinforcing layer of flexible steel cable, a body of rubber surrounding the cable and vulcanized thereto, a plurality of metal shoes secured to the belts, every other metal shoe including an inner plate and an outer plate, means securing the plates together, a track guide member secured to the center of the inner side of the shoe, the alternate metal shoes including parts laterally spaced from each other so as to provide recurrent central openings in the track for the reception of a series of track driving lugs, each part of the alternate metal shoes comprising an inner plate and an outer plate, and means securing the plates together, the adjacent sides of the shoes being curved so as to provide a rolling contact between shoes in the operation of the track.

4. An endless track for tractors, tanks, and the like, comprising a plurality of endless belts spaced apart laterally of each other, each belt including a reinforcing layer of flexible steel cable, a body of rubber surrounding the cable and vulcanized thereto, a plurality of metal shoes secured to the belts, and a track guide member secured to the center of the inner side of every other shoe, the shoes not having guide members secured thereto including parts laterally spaced from each other so as to provide recurrent central openings in the track for the reception of a series of track driving lugs, the last-named shoes being radially thinner than the shoes carrying the guide members and serving both as shoes and as links.

5. An endless track for tractors, tanks, and the like, and comprising a plurality of strong flexible cable-reinforced rubber-covered belts positioned in parallel, laterally-spaced relation, and a plurality of metal shoes secured transversely of the belts, said shoes having arcuate ends providing rolling end to end contact with each other.

6. An endless track for tractors, tanks, and other vehicles and comprising flexible steel cable means covered with rubber, and a plurality of metal shoes secured transversely to each of the cable means, every other metal shoe extending completely across the cable means, alternate metal shoes being made in two laterally-spaced parts providing a central opening for the introduction of a driving lug, said alternate and other metal shoes having end to end engagement with one another.

7. An endless track for tractors, tanks, and other vehicles and comprising flexible steel cable means covered with rubber, a plurality of metal shoes secured transversely to each of the cable means, every other metal shoe comprising a main drive shoe extending completely across the cable means, alternate metal shoes being made in two laterally-spaced parts providing a central opening for the introduction of a driving lug, said alternate and other metal shoes having a rolling end to end contact with each other, and rubber filler collars between the contacting ends of the shoes and surrounding each of the cable means for preventing the working in of foreign matter between the cable means and the metal shoes.

8. An endless track for tractors, tanks, and other vehicles and comprising flexible steel cable means covered with rubber, and a plurality of metal shoes secured transversely to each of the cable means, every other metal shoe comprising a main driving shoe extending completely across the cable means, alternate metal shoes comprising link-shoes and being made in two laterally-spaced parts providing a central opening for the introduction of a driving lug, said alternate and other metal shoes having a rolling end to end contact with each other.

9. An endless track for tractors, tanks, and other vehicles and comprising flexible steel cable means covered with rubber, and a plurality of metal shoes secured transversely to each of the cable means, every other metal shoe extending completely across the cable means, alternate metal shoes being made in two laterally-spaced parts providing a central opening for the introduction of a driving lug, said alternate and other metal shoes having semi-cylindrical hinge connections between them.

10. An endless track for vehicles comprising a pair of flexible steel cables, a rubber covering vulcanized on each cable, the cables being wound into helical convolutions of opposite hand, with the convolutions being positioned in parallel but laterally-spaced relation, a plurality of main driving metal shoes secured at circumferentially-spaced points on the convolutions and securing the convolutions together but in laterally-spaced relation and holding the turns of each convolution in properly spaced relation to the other turns, and anchoring the bare flared, frustro-conical ends of the cables, each metal shoe being made with an inner plate and an outer plate having complementary recesses for receiving and clamping around the cables, means for securing the plates together, a track guiding member secured to the inner center of the metal shoe, a pair of metal link-shoes positioned between adjacent main shoes, the pair of link-shoes being separated laterally to receive a driving lug between them and the adjacent main shoes, each one of the pair of link-shoes having an inner and an outer plate provided with complementary recesses receiving and clamping around the cables, and means securing the plates of each link-shoe together, the ends of the recesses receiving the cables in the main shoes and link-shoes being flared to facilitate bending of the track around a wheel, and semi-cylindrical hinge joints between the main shoes and link-shoes.

11. An endless track for vehicles comprising a pair of flexible steel cables, a rubber covering vulcanized on each cable, the cables being wound into helical convolutions of opposite hand with the convolutions being positioned in parallel but laterally-spaced relation and with each turn of each convolution being spaced from every other turn, a plurality of metal shoes secured at circumferentially-spaced points on the convolutions for securing the convolutions together but in laterally-spaced relation and holding the turns of each convolution in properly spaced relation to the other turns and anchoring the ends of the cables, each metal shoe being made with an inner plate and an outer plate having complementary recesses for receiving and clamping around the cables, means for securing the plates together, a pair of metal link-shoes positioned between adjacent metal shoes, the pair of link-shoes being separated laterally to receive a driving lug between them and the adjacent metal shoes, each one of the pair of link-shoes having an inner and an outer plate provided with complementary recesses receiving and clamping around the cables, and means securing the plates of each link-shoe together, and semi-cylindrical hinge joints between the shoes and link-shoes.

12. An endless track for vehicles comprising a pair of flexible steel cables, a rubber covering vulcanized on each cable, the cables being wound into helical convolutions of opposite hand with the convolutions being positioned in parallel but laterally-spaced relation, a plurality of metal shoes secured at circumferentially spaced points on the convolutions for securing the convolutions together but in laterally-spaced relation and holding the turns of each convolution in properly spaced relation to the other turns and anchoring the ends of the cables, each metal shoe being made with an inner plate and an outer plate having complementary recesses for receiving and clamping around the cables, means for securing the plates together, a pair of metal link-shoes positioned between adjacent metal shoes, the pair of link-shoes being separated laterally to receive a driving lug between them and the adjacent metal shoes, each one of the pair of link-shoes having an inner and an outer plate provided with complementary recesses receiving and clamping around the cables, and means securing the plates of each link-shoe together, the ends of the recesses receiving the cables in the shoes and link-shoes being flared to facilitate bending of the track around a wheel.

13. An endless track for vehicles comprising a pair of flexible steel cables, a rubber covering vulcanized on each cable, the cables being wound into helical convolutions of opposite hand with the convolutions being positioned in parallel but laterally-spaced relation, a plurality of main shoes secured at circumferentially-spaced points on the convolutions for securing the convolutions together but in laterally-spaced relation and holding the turns of each convolution in properly spaced relation to the other turns and anchoring the ends of the cables, each main shoe being made with an inner and an outer part having complementary recesses for receiving and clamping around the cables, means for securing the parts together, a pair of link-shoes positioned between adjacent main shoes, the pair of link-shoes being separated laterally to receive a driving lug between them and the adjacent main shoes, each one of the pair of link-shoes having an inner and an outer part provided with complementary recesses receiving and clamping around the cables, and means securing the parts of each link-shoe together.

14. An endless track for vehicles comprising a flexible steel cable, a rubber covering vulcanized to the cable, the cable being wound into a helical convolution, a plurality of main metal shoes secured transversely at uniformly-spaced circumferential points on the convolution for holding each turn of the convolution in laterally-spaced relation to the other turns, a pair of metal link-shoes positioned between the main shoes and secured to the convolutions, the pair of link-shoes being separated laterally to receive a driving lug between them and the main shoes, and semi-cylindrical hinge joints between the shoes and link-shoes.

15. An endless track for vehicles comprising a flexible steel cable, a rubber covering vulcanized to the cable, the cable being wound into a helical convolution, a plurality of main shoes secured transversely at uniformly-spaced circumferential points on the convolution for holding each turn of the convolution in laterally-spaced relation to the other turns, and a pair of link-shoes positioned between the main shoes and secured to the convolutions, the pair of link-shoes being separated laterally to receive a driving lug between them and the adjacent main shoes, the shoes and link-shoes having end to end engagement with each other.

HANS F. KECK.